US012761116B2

(12) United States Patent
Perrot

(10) Patent No.: US 12,761,116 B2
(45) Date of Patent: Oct. 13, 2026

(54) METHOD OF DETERMINING A HYDRAULIC TIMING OF A FUEL INJECTOR

(71) Applicant: DELPHI TECHNOLOGIES IP LIMITED, St. Michael (BB)

(72) Inventor: Baptiste Perrot, Blois (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 408 days.

(21) Appl. No.: 18/563,566

(22) PCT Filed: Aug. 26, 2022

(86) PCT No.: PCT/EP2022/073850
§ 371 (c)(1),
(2) Date: Nov. 22, 2023

(87) PCT Pub. No.: WO2023/025959
PCT Pub. Date: Mar. 2, 2023

(65) Prior Publication Data

US 2024/0219263 A1 Jul. 4, 2024

(30) Foreign Application Priority Data

Aug. 26, 2021 (GB) ..................................... 2112218

(51) Int. Cl.
*G01M 15/09* (2006.01)

(52) U.S. Cl.
CPC .................................. *G01M 15/09* (2013.01)

(58) Field of Classification Search
CPC ...... G01M 15/09; G01M 15/04; G01M 15/00; F02D 2041/286; F02D 41/28;
(Continued)

(56) References Cited

U.S. PATENT DOCUMENTS 6,276,337 B1 8/2001 Minato
7,437,234 B2 10/2008 Halleberg
(Continued)

FOREIGN PATENT DOCUMENTS

CN 10315448 B * 10/2011 ............. F02D 41/24
DE 102014222542 A1 5/2016
GB 2569579 A 6/2019

OTHER PUBLICATIONS

Krogerus et al., "Analysis of common rail pressure signal of dual-fuel large industrial engine for identification of injection duration of pilot diesel injectors", Dec. 6, 2017, Elsevier, pp. 1-9. (Year: 2017).*

(Continued)

*Primary Examiner* — Mohamed Charioui
(74) *Attorney, Agent, or Firm* — WARNER NORCROSS + JUDD LLP

(57) ABSTRACT

A method of determining a hydraulic timing of a fuel injector in an internal combustion engine, wherein the injector is coupled to a fuel rail comprising a pressure sensor. The method comprises:

acquiring fuel pressure data, obtained by the pressure sensor, representing fuel pressure in the fuel rail over an acquisition window comprising an injection event of the injector;

determining a slope parameter corresponding to a pressure drop consequential to the injection event, the slope parameter being read from a slope map;

configuring a pressure drop model based on the slope parameter; and operating a fitting operation wherein the pressure drop model is fitted to the fuel pressure data, and wherein the hydraulic timing is derived from the pressure drop model.

19 Claims, 5 Drawing Sheets

(58) Field of Classification Search
CPC .......... F02D 41/26; F02D 41/24; F02D 41/00; F02D 41/3809; F02D 2200/0602; F02D 2200/0618; F02D 41/401; F02M 65/003; F02M 65/005
See application file for complete search history.

(56) References Cited

U.S. PATENT DOCUMENTS

| | | | | |
|---|---|---|---|---|
| 10,900,436 | B2 | 1/2021 | Pursifull et al. | |
| 2003/0121501 | A1 * | 7/2003 | Barnes | F02D 41/2422 123/456 |
| 2009/0223487 | A1 * | 9/2009 | Dingle | F02M 57/005 701/103 |
| 2013/0111900 | A1 * | 5/2013 | Hagner | F02B 37/18 123/445 |
| 2017/0152805 | A1 | 6/2017 | Schenk et al. | |
| 2021/0372342 | A1 * | 12/2021 | Schmitt | F02D 41/3809 |

OTHER PUBLICATIONS

Cracknell, “8th International Symposium Towards Clean Diesel Engines TCDE 2011”, 2011, University if Birmingham, pp. 1-85. (Year: 2011).*
Lai et al., “Interpolation Methods for Time-Delay Estimation Using Cross-Correlation Method for Blood Velocity Measurement”, 1999 , IEEE, pp. 277-290. (Year: 1999).*
International Search Report for PCT/EP2022/073850 dated Dec. 9, 2022, 5 pages.
Machine assisted English translation of DE102014222542A1 obtained from https://worldwide.espacenet.com/patent on Nov. 21, 2023, 13 pages.

* cited by examiner

METHOD OF DETERMINING A HYDRAULIC TIMING OF A FUEL INJECTOR

CROSS-REFERENCE TO RELATED APPLICATIONS

This application is the U.S. National Stage of International Application No. PCT/EP2022/073850 filed on 26 Aug. 2022, which claims priority to and all advantages of United Kingdom Application No. 2112218.9 filed on 26 Aug. 2021, the contents of which are incorporated herein by reference.

FIELD OF THE INVENTION

The present invention generally relates to fuel injection systems in internal combustion engines and in particular to a method of determining certain characteristics of fuel injectors such as hydraulic timing of injector opening.

BACKGROUND OF THE INVENTION

The contemporary design of internal combustion engines must cope with the increasingly stringent regulations on pollutant emissions. Accordingly, automotive engineers strive for designing engines with low fuel consumption and low emissions of pollutants, which implies including electronic devices capable of monitoring the combustion performance and emissions in the exhaust gases.

A proper operation of a fuel-injected engine requires that the fuel injectors and their controller allow for a timely, precise and reliable fuel injection. Indeed, it is well known that problems arise when the performance, or more particularly the timing, and the quantity of fuel delivered by the injectors diverge beyond acceptable limits. For example, injector performance deviation or variability will cause different torques to be generated between cylinders due to unequal fuel quantities being injected, or from the relative timing of such fuel injection.

As it is known, fuel injectors are typically controlled by generating pulses which are sent to the actuators of the fuel injectors. The amount of fuel injected depends on the length of the pulse sent to the actuator. Typically, an Engine Control Unit adjusts the pulse length as a result of the demand quantity of fuel to be injected. The demand quantity of fuel is typically stored in a map which relates this to engine speed and torque demand.

Characteristics of fuel injectors may vary, as well as change over time for the same fuel injector, e.g. as a result of wear. It is important to calibrate the injection systems/injectors periodically so that variations in their lifetime are catered for, and that the control is adapted to deal with such variations. Techniques are known which apply learning strategies, whereby injector characteristics are freshly determined, and the injectors are consequently appropriately controlled.

Two parameters of interest in this context are the injector opening delay and the injected fuel quantity.

For a proper control of the engine performance it is desirable to know the time at which the injector opens, i.e. when the injector needle/pintle lifts off from the nozzle seat within the injector.

Indeed, whereas the injection electric timing is known because it is commanded by the ECU at a precise timing, the needle will only lift off from its seat after a certain time from the start of the control pulse. This time delay is often referred to as opening delay. The moment at which the injector needle/pintle actually lifts off, i.e. opens, may be referred to as hydraulic timing and depends on many parameters, amongst which injector technology, fuel type, injection pressure, injector age . . . .

Often hydraulic timing is estimated using opening delay maps. This is an open loop control. However, it is today desirable for OBD (On-Board Diagnostics) to determine if this hydraulic timing is correct, or if there is drift, because it impacts engine performance.

One known approach to estimate the opening delay is based on differential voltage analysis across the injector.

According to another approach, the fuel injector is designed to include a switch function, wherein the hydraulic timing is read by a voltage crenel.

As regards the determination of injected fuel quantity, this can be done by so-called Pressure Drop Analysis (PDA), which is disclosed in GB 2533104 A. The PDA strategy is based on a relationship between a pressure drop in the fuel rail (common rail/accumulator) consequently to an injection event and the corresponding injected fuel quantity. A map is thus built to calibrate pressure drop vs. injected quantity, and this map is used during engine operation to determine the injected fuel quantity based on the pressure drop measured by means of a pressure sensor arranged on the fuel rail.

OBJECT OF THE INVENTION

The object of the present invention is to provide an improved method of determining a hydraulic timing of a fuel injector for application in fuel control systems and methods.

This object is achieved by a method as claimed in claim 1.

SUMMARY OF THE INVENTION

The present invention proposes a (computer implemented) method of determining a hydraulic timing of a fuel injector in an internal combustion engine, wherein the injector is coupled to a fuel rail comprising a pressure sensor. The method comprises the steps of:

- acquiring fuel pressure data, obtained by means of the pressure sensor, representing fuel pressure in the fuel rail over an acquisition window comprising an injection event of said injector;
- determining a slope parameter corresponding to a pressure drop consequential to the injection event, the slope parameter being read from a slope map;
- defining a pressure drop model based on the slope parameter; and
- operating a fitting operation, wherein the pressure drop model is fitted to the fuel pressure data, and wherein the hydraulic timing is derived from the pressure drop model.

The present method permits determining a timing of a fuel injector such as a hydraulic timing of injector opening, i.e. the timing at which the injector needle lifts off from its nozzle seat consequential to an applied electric command pulse. The time period between the hydraulic timing and the start of the electric command pulse represents the so-called opening delay. The hydraulic timing is a useful information for the fuel injection control system, for control and/or diagnostic purposes.

The present method exploits a so-called 'slope map' that represents a relationship between the pressure drop due to an injection event and the slope characterizing the pressure drop corresponding to the injection event. As is known in the art, the pressure drop is characteristic of the injection system and depends on the opening time (duration of injector opening). The slope map is thus a table mapping the pressure drop vs. corresponding slope of the pressure drop. The slope map is a calibrated map and the slopes of the respective pressure drops can for example be determined by fitting the measured pressure data with a straight line. Respectively, the slope parameter may be determined as the slope of the straight line obtained by linear regression that matches the measured data points corresponding to the injection related pressure decrease.

Furthermore, the present method uses a pressure drop model that is characterized by the slope parameter corresponding to the observed injection event. A fitting operation is then performed, wherein the pressure drop model is fitted to the fuel pressure data, and the hydraulic timing is derived/deducted from the pressure drop model. Typically, the hydraulic timing corresponds to a predetermined point of the model, e.g. point in the transition region between the maximum pressure and upper region of the pressure drop.

As used herein, ‘injection event’ (which may also be referred to as ‘injector event’) refers to a selective opening of the fuel injector, consequential to an electric command pulse applied to the fuel injector. The electric timing of the command pulse being known, the acquisition window is predefined/calibrated to encompass the pressure drop, i.e. acquire pressure data before and after the pressure drop.

The present invention thus permits determining the hydraulic timing of a fuel injector by means of the rail pressure sensor. The so-determined hydraulic timing information can be used by OBD (on-board diagnostics) to confirm the injection pattern and the good injector performance. This method can be used with different engine technologies like gasoline direct injection (GDi), Diesel, natural gas (CNG) or hydrogen (H2).

A rail pressure sensor is always available on a common rail system whatever the fuel type. This rail pressure sensor is used for rail pressure control but it is also typically used for determining the injected fuel quantity based on the analysis of the fuel pressure drop in the system during an injection event. This strategy is usually referred to as Pressure Drop Analysis or PDA.

Conventionally the PDA strategy works doing a rail pressure sensor acquisition, determining from the measured pressure data the average pressure before an injection (Pmax) and the average pressure after an injection event (Pmin). The difference between the two pressures Pmax and Pmin is referred to as ΔP. This ΔP is compared to maps (generally depending on fuel type, temperature, injector type, system pressure) that relate ΔP to the injected fuel quantity.

The present method then also allows taking advantage of available information already determined by a conventional PDA analysis, to determine the injection position, and hence the hydraulic timing of the injection.

For a given injection system, the pressure drop slope can be measured and mapped. This slope map mainly depends on the initial pressure, high pressure volume of the injection system, temperature, fuel type and injector type.

Based on max pressure and min pressure (as e.g. determined by a PDA strategy) and on the pressure drop slope map, a simplified pressure drop model can be determined/configured in relation to a given injection event. The fitting operation consists generally in fitting the pressure drop model, characterized by the slope parameter, on the fuel pressure data in order to derive/deduct the hydraulic timing of the injector for the given injection event. Here a minimized-error fit approach can be implemented.

In embodiments, the pressure drop model is based on the slope parameter as well as on a maximum pressure, Pmax, and on a minimum pressure, Pmin, corresponding respectively to fuel rail pressures before and after the injection event. Pmax and Pmin may typically represent average pressures over a predetermined time period before and after the injection event.

The fuel pressure data, Pmax, Pmin as well as ΔP (the difference between Pmax and Pmin) may be measured and determined from the fuel pressure data for the purpose of the present method, or may be already available in an ECU configured to implement a Pressure Drop Analysis strategy.

In embodiments, the pressure drop model describes a function having a first section at Pmax, a middle section connecting said first section to a third section at Pmin, the middle section corresponding to a straight line having a slope matching the slope parameter. The pressure drop model thus describes a kind of down step signal with a first, constant/flat section, a ramp down section characterized by the slope parameter and a third, constant/flat section. This is a simplified model that depicts a theoretic/expected shape of the pressure around the injection event. In that sense the pressure drop model may be considered to form a ‘shape model’.

In embodiments, the slope map is dependent upon at least one of an initial pressure (Pmax), a high-pressure volume of injection system, a temperature, a fuel type, an injector type.

The slope map is thus calibrated for a given injection system.

First tests with the present inventive method have confirmed the validity of the proposed approach. The method is preferably implemented to check or learn the hydraulic timing of fuel events configured to deliver fuel quantities of at least 10, 15 or 20 mg.

Preferably, the fitting operation comprises computing the pressure drop model for a plurality of timings and determining a corresponding fitting index reflecting the degree of matching between the fuel pressure data and pressure drop model, and selecting the timing at which the best fitting index is obtained.

Conveniently, the fitting index may represent the area between the curve described by the pressure data and the pressure drop model. The timing corresponding to the fitting index representing the lowest area may then be selected as the hydraulic timing.

Preferably, the hydraulic timing corresponds to the timing bridging (switch/transition point) the first and second sections of the pressure drop model with the best fitting index. In particular, the hydraulic timing may correspond to the intersection between the first and second sections of the pressure drop model.

A particular advantage of the present method is its ease of implementation, requiring simple calculations. As will be known to the skilled person, a lot of perturbations (high & low frequencies) can appear, depending on high pressure system volume, pressure value or operating point and will affect a local timing determination method. Furthermore, method based on mathematical derivation of the pressure data could be also wrong and would require substantial calculations.

By contrast, the present method, using a ‘shape’ model, is efficient whatever the rail pressure sensor signal profile and first test have proven its efficiency in practice.

According to another aspect, the invention relates to a fuel injection system as claimed in claim 9.

According to another aspect, the invention relates to method of operating a fuel injection system.

The present method may typically be implemented by software (program code/instructions) implemented by a computer, such as an engine control unit.

According to another aspect, the invention relates to computer program as claimed in claim 11.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
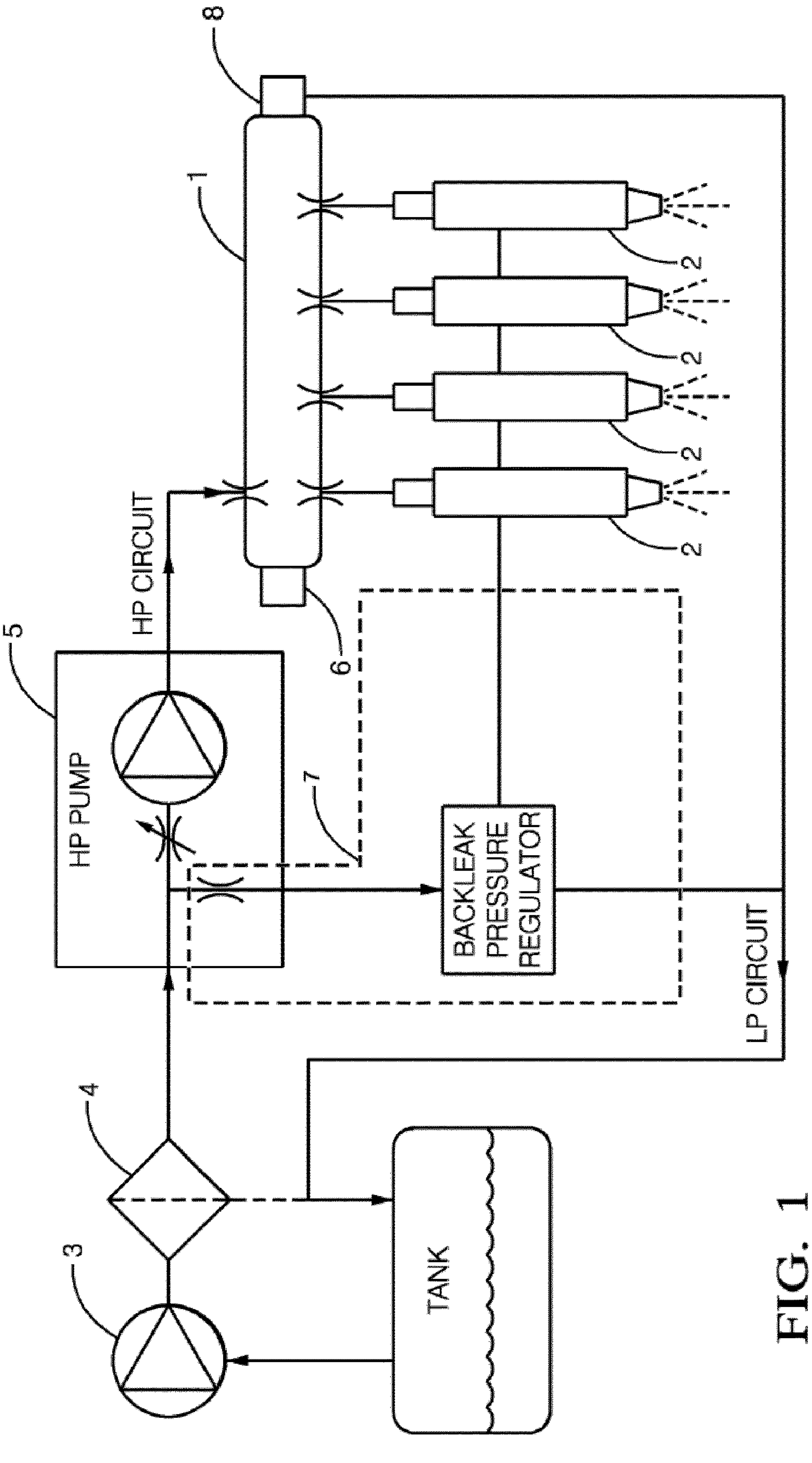
FIG. 1: is a principle diagram of a known fuel injection circuit for an internal combustion engine.

FIG. 1 is a principle diagram of a known fuel injection circuit as commonly used in an internal combustion engine. It comprises a common fuel rail 1 (or accumulator) fluidly connecting the fuel therein to a series of injectors 2 (e.g. of solenoid actuated fuel injectors). The circuit typically includes an in tank electrical fuel pump 3, a fuel filter 4, and a high-pressure pump 5. A high-pressure sensor 6 is located on the common rail 1 as shown in order to measure the fuel pressure inside the common rail 1. A high-pressure valve 8 is provided on the common rail 1, which is a safety valve that opens when the pressure exceeds a preset value (typically passive in gasoline engines but can be controlled, e.g. in diesel systems). Reference sign 7 indicates a backleak circuit including a backleak regulator and injector return line, which is typically present in diesel fuel injection systems. Such backleak circuit 7 is typically used for indirectly controlled fuel injectors (Diesel injectors include a solenoid-controlled valve that hydraulically controls the needle), but is not required for injectors where the pintle is directly controlled via the solenoid. Hence, the backleak circuit 7 is usually not present on gasoline, GDi, CNG or H2 systems.

Figure 2:
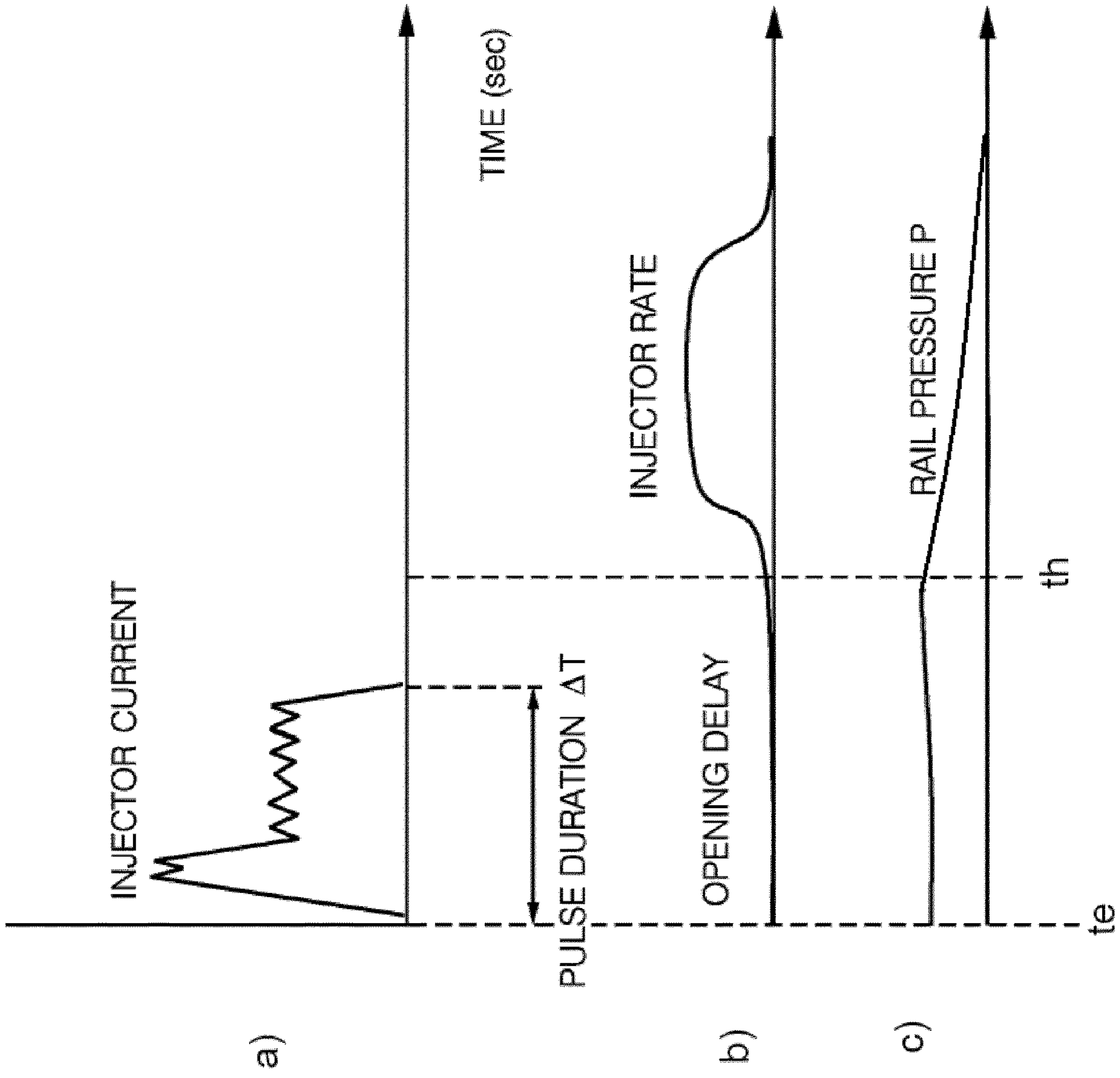
FIG. 2: shows graphs of (a) injector current; (b) injector needle lift-off; and (c) rail pressure in function of time for an injection event.

FIG. 2 shows several well-known graphs related to an injection event. The first two graphs (a and b) illustrate the delayed response of the injector following the electrical command. FIG. 2*a* shows typically the current through the actuator of a fuel injector 2 as a result of an actuation pulse of duration ΔT sent from the ECU. The timing of this actuation pulse (i.e. electric command pulse) is typically determined by the Engine Control Unit, which adjusts the pulse length as a result of the demand quantity of fuel to be injected. The demand quantity of fuel is typically stored in a map which relates this to engine speed and torque demand.

FIG. 2*b* shows the actuator needle lift, which defines the actual volume of fuel dispensed over time. As can be seen, there is a delay between the start of the electric pulse and the opening of the actuator valve to dispense fuel, currently referred to as 'opening delay'. Reference $t_e$ indicates the electric timing of injection, i.e. the start of the electrical pulse. Time $t_h$ correspond to the moment when the injector starts opening (needle lifts-off from seat) and hence fuel start flowing into the combustion chamber. This time $t_h$ is referred to as hydraulic timing of the injector and thus represents the actual time of the injection event at which fuel started to flow through injector.

FIG. 2*c* shows the pressure in the common rail consequent to the injection event. As can be seen, opening of the injector due to an applied drive pulse is delayed and causes a pressure drop at a time essentially corresponding to the hydraulic timing of injection.

The possibility of relating the fuel pressure drop in the fuel rail consequential to an injection event with the injected quantity is disclosed in GB 2533104 A and known as Pressure Drop Analysis (PDA).

Figure 3:
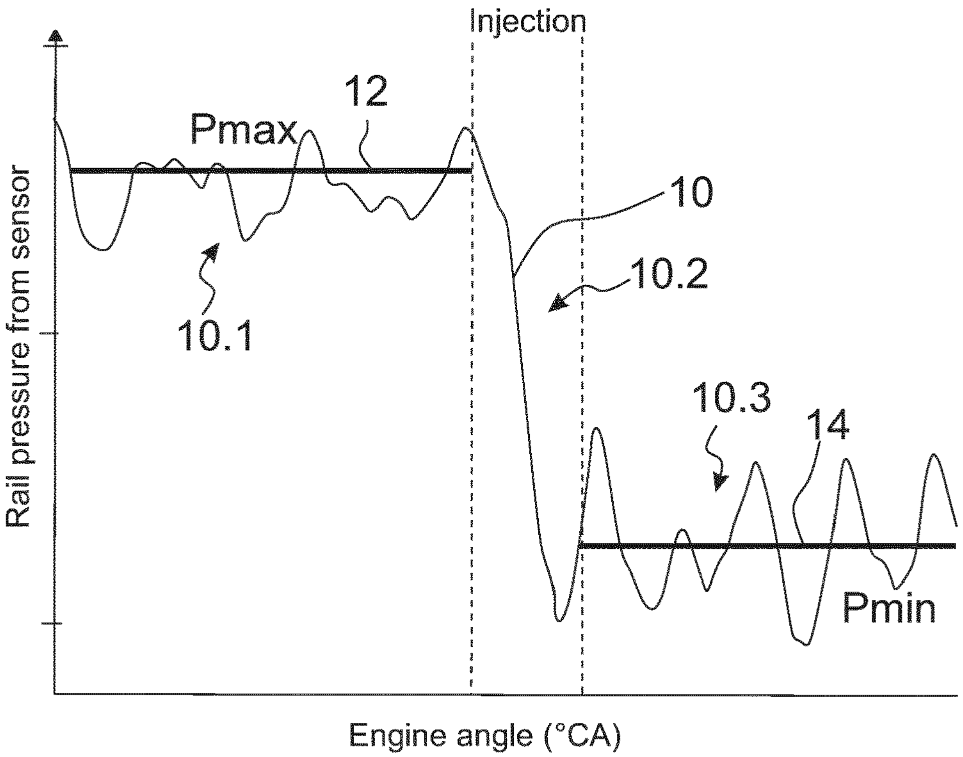
FIG. 3: is a graph showing the rail pressure vs. time for an injection event.

The implementation of PDA is generally done by determining the pressures before (Pmax) and after (Pmin) the injection event. The pressure within the fuel rail 1 varies a lot due to several factors and conventional PDA strategies calculate the average pressure on both sides of the pressure drops. This is illustrated in FIG. 3 where line 10 represents the measured pressure vs. time (here expressed as engine angle—degrees of crank angle) over a given acquisition window. The size of the acquisition window is generally predetermined to encompass a certain time period before and after the expected injection event (the electric timing of which is known). As can be seen, the pressure trace 10 mainly comprises three sections. A first section 10.1 in the higher-pressure range, a second section 10.2 describing a sharp decreasing line down to a third section 10.3 in the lower pressure range. The pressure drop illustrated by section 10.2 is due to fuel leaving the fuel rail 1 and flowing through the injector 2, and is characteristic of the injection system and opening duration.

The PDA strategy will calculate the average pressure Pmax, indicated by line 12, before the injection, as well as the average pressure Pmin, at the end of the injection event, as indicated by line 14. The difference between Pmax and Pmin is noted ΔP.

The PDA strategy conventionally uses a calibrated relationship between ΔP and injected fuel quantity, which is typically stored in a map MAP-ΔP also normally depending on fuel type, temperature, injector type and system pressure.

Inventive Method

In the present embodiment, the inventive method advantageously uses existing equipment, namely the pressure sensor 6, and available information, namely Pmax and Pmin, in order to determine the hydraulic timing of injection due to a fuel injection event.

It will be appreciated that the present method uses a map of the pressure drop slope, noted MAP-SLP, relating ΔP to a corresponding slope parameter representing the decreasing section (section 10.2) of the pressure trace. This map MAP-SLP mainly depends on initial pressure (Pmax), high pressure volume of the injection system, temperature, fuel type and injector type. During calibration, the pressure drop ΔP is approximated to a straight line and the corresponding slope is stored as the "slope parameter" in the map MAP-SLP.

Based on maximum and minimum pressures (Pmax, Pmin as typically determined by the PDA strategy) related to a fuel injection event and on the corresponding slope parameter of the pressure drop pressure (as determined from MAP-SLP), a simplified pressure drop model is determined.

Figure 4:
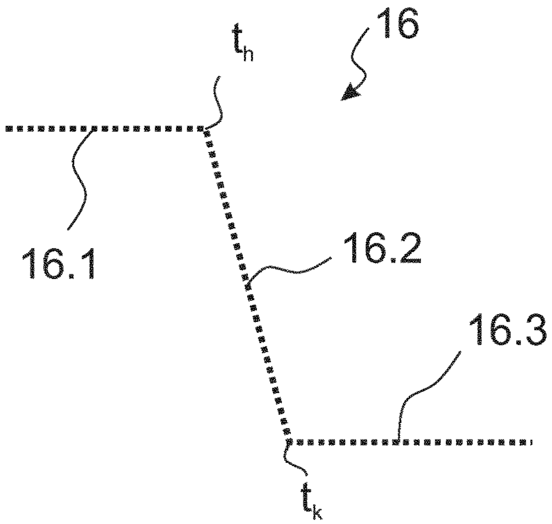
FIG. 4: is a principle diagram showing the shape of the pressure drop model.

The idea here is to have a "shape" model that is compared, during a fitting operation, to the measured fuel rail pressure data for the relevant injection event, in order to select the best fit. The principle of the shape model is shown in FIG. 4 and basically describes a curve 16 that comprises three sections similar to the typical profile/trace of the measured fuel pressure data (as in FIG. 3):

- a first section 16.1: flat line corresponding to Pmax;
- a second section 16.2 describing a straight line characterized by the slope parameter;
- a third section 16.3: flat line corresponding to Pmin.

The first and third sections 16.1, 16.3 have values corresponding to Pmax and Pmin as available from the PSA strategy.

The second section 16.2 is calculated based on MAP-SLP in order to join the two other sections 16.1 and 16.3. The second section 16.2 may be computed based on formula y=ax+b, where a is the slope parameter obtained from MAP-SLP. The intersection between lines 16.1 and 16.2 is, by hypothesis, the hydraulic time $t_h$ corresponding to injector opening.

The shape model 16 is then used in a fitting operation applied to the rail pressure data over a predetermined time, referred to as analysis window, surrounding the injection event. This comparison is done to determine the best fit between the model 16 and the measured data 10.

The fitting operation advantageously uses an error model wherein an index representing the area between the model 16 and pressure data 10 is computed at a plurality of positions (time points) surrounding the slope section 10.2. The position giving the minimum error (i.e. min index value, respectively min. area) will then be the selected as the hydraulic timing of injection.

Figure 5:
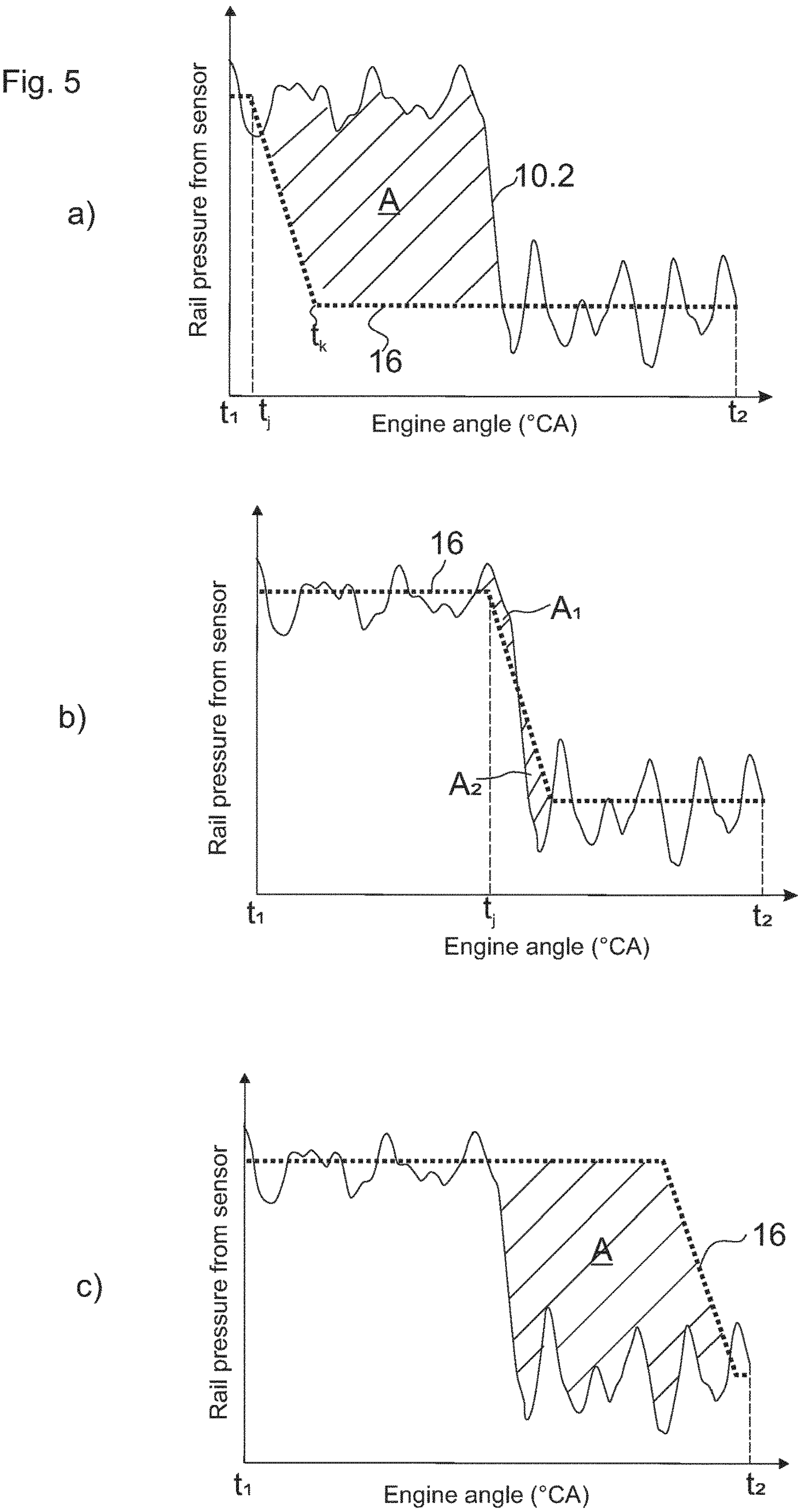
FIG. 5: shows graphs illustrating the model error for three fitting examples.

The principle of the fitting operation is illustrated in FIG. 5 (rail pressure vs. time expressed as engine angle—degrees of crank angle). The idea is that the shape model 16 is moved or "swept" through the sensor data within the analysis window (same or shorter length as the acquisition window). The shape model is, so to speak, swept/slid from left to right, by predetermined time increments, and the area between the model and curve is computed at each position.

Example of Implementation of the Present Method

Let us suppose that the pressure drop model defines a function noted $F_m$ extending over a fixed time period TM between $t_1$ and $t_2$. The function $F_m$ is defined for a finite number of timings over the analysis window TM (corresponding to sampling frequency). It is thus a table comprising N values for each timing $t_j$ between $t_1$ and $t_2$.

The pressure drop model $F_m$ can be computed for each timing tj>t1, such that:

- Section 16.1 is a straight line at value Pmax between $t_1$ and $t_j$;
- Section 16.2 begins at $t_j$ and decreases at the rate of the slope parameter between $t_j$ and $t_k$;
- Section 16.3 begins at $t_k$ and is a straight line at Pmin up to $t_2$.

As will be understood, computing $F_m$ for each tj over the range ($t_1$, $t_2$) allows fitting the pressure drop model over the pressure data.

Figure 6:
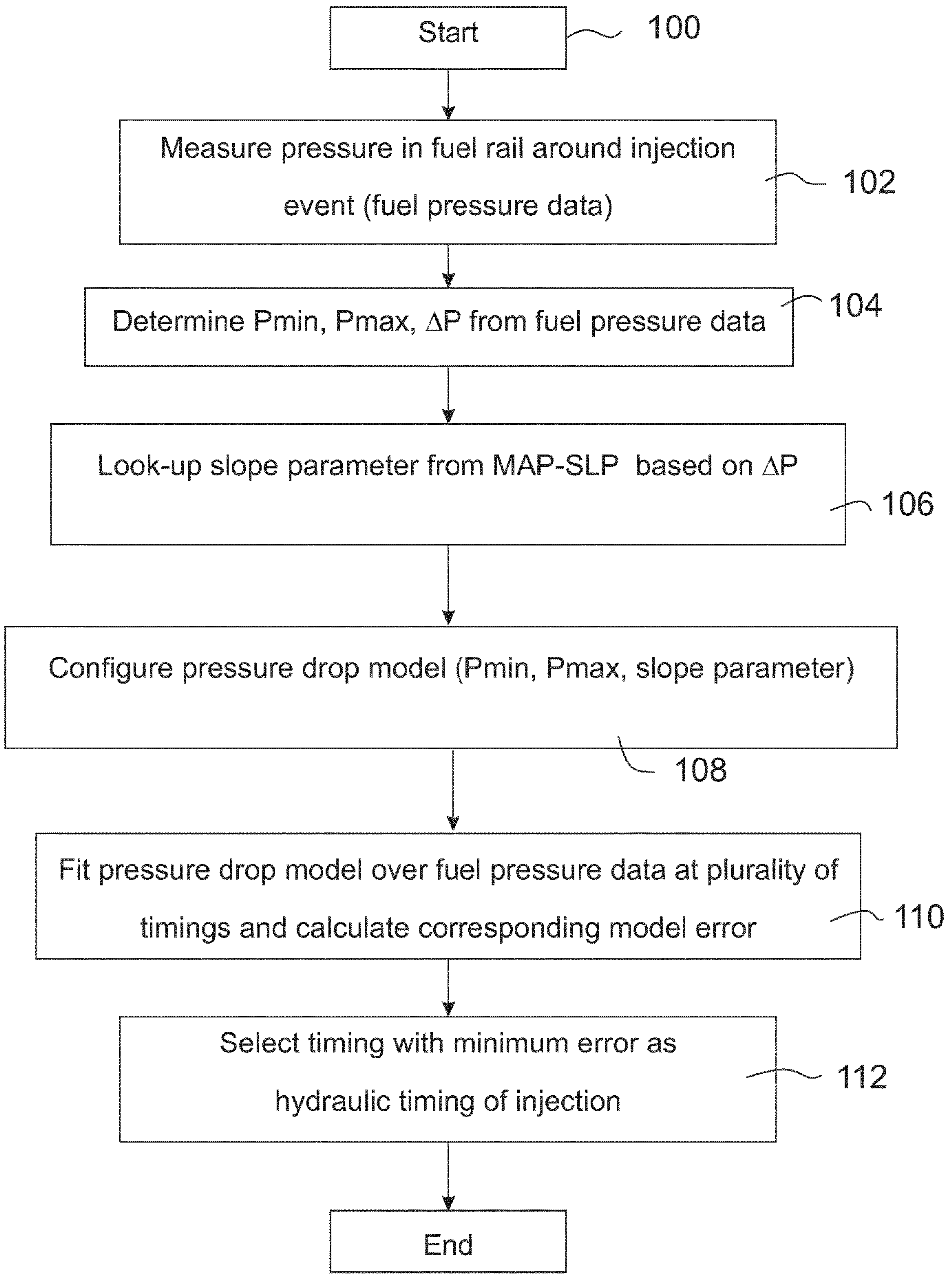
FIG. 6: is a flowchart illustrating an embodiment of the present method.

Turning now to FIG. 6, an embodiment of the present method starts at 100 and begins at 102 with acquiring pressure data by means of pressure sensor for a given fuel injection event.

Next, at 104, Pmax, Pmin and ΔP are determined from the pressure data. They may be calculated or obtained from the PDA strategy.

Then, 106, the slope parameter corresponding to the pressure drop ΔP for this injection event is read from MAP-SLP.

At 108, the function FM of the pressure drop model is configured (or initialized) by setting the values of Pmax, Pmin and slope parameter.

At 110, the fitting operation is performed. For each function $F_M$ calculated for a time $t_j$, the function is compared to the fuel pressure data over same time range TM, and the area between the two curves is determined. Of course, in practice the curves are not graphically represented and the control unit is configured to process the numerical values and directly compute this integration.

FIG. 5 *a*) represents the pressure drop model $F_M$ towards the beginning of the iterative process, where $t_j$ is small. The area A between the model 16 and the measured data is very large.

As $t_j$ moves to the right towards the injection timing, the area A will progressively decrease. As the section 16.2 will come closer toward $t_h$, the area A will decrease towards much smaller values. Past the injection region, the area will increase again, as understood from FIG. 5 *c*).

In the region of the injection, the fitting operation will determine the areas A1 and A2 on both sides of the straight section 16.2, whereby the relevant area is A=A1+A2.

As will be understood, the area A will be minimal in the region of the injection. The timing $t_j$ for which the function gives a minimal area A is the hydraulic timing $t_h$ (box 112).

Compared to state of the art, this method gives a feedback of the real hydraulic timing of injection. This injection timing determination doesn't require specific differential voltage acquisition and treatment. Its overall performance is good to validate a timing error. The present method is better in term of OBD because it is looking to the direct global hydraulic effect, not using another electric signal for timing determination (ICLC method for example). The present method can cover applications like GDi, Diesel, CNG or $H_2$.

The invention claimed is:

1. A method of determining a hydraulic timing of a fuel injector in an internal combustion engine, wherein the injector is coupled to a fuel rail comprising a pressure sensor, the method comprising:

- acquiring fuel pressure data, obtained by the pressure sensor, representing fuel pressure in the fuel rail over an acquisition window comprising an injection event of the injector;
- determining a slope parameter corresponding to a pressure drop consequential to the injection event, the slope parameter being read from a slope map;
- configuring a pressure drop model based on the slope parameter; and
- operating a fitting operation wherein the pressure drop model is fitted to the fuel pressure data, and wherein the hydraulic timing is derived from the pressure drop model;
- wherein the pressure drop model is based on the slope parameter as well as on a maximum pressure, Pmax, and on a minimum pressure, Pmin, corresponding respectively to average fuel rail pressures before and after the injection event.

2. The method according to claim 1, wherein the pressure drop model describes a function having a first section at Pmax, a second section connecting the first section to a third section at Pmin, the second section corresponding to a straight line having a slope matching to the slope parameter.

3. The method according to claim 2, wherein the hydraulic timing corresponds to the timing bridging the first and second sections.

4. The method according to claim 1, wherein the slope map is dependent upon at least one of an initial pressure (Pmax), a high-pressure volume of injection system, a temperature, a fuel type, and/or an injector type.

5. The method according to claim 1, wherein the method is implemented for fuel events configured to deliver fuel quantities of at least 10, 15 or 20 mg.

6. The method according to claim 1, wherein operating the fitting operation comprises computing the pressure drop model for a plurality of timings corresponding to a sampling frequency over an analysis window, and determining a corresponding fitting index reflecting the degree of matching between the fuel pressure data and the pressure drop model, and selecting the timing at which the best index is obtained.

7. The method according to claim 6, wherein the fitting index represents the area between the curve described by the pressure data and the pressure drop model, and wherein the timing corresponding to the fitting index representing the smallest area is selected as hydraulic timing.

8. A fuel injection system for an internal combustion engine, comprising a fuel injector coupled to a fuel rail equipped with a pressure sensor, and a control unit configured to command an injection event of the fuel injector, wherein the control unit is further configured to perform a method as claimed in claim 1.

9. A method of operating a fuel injection system for an internal combustion engine, wherein a hydraulic timing of an injection event is determined based on the method according to claim 1, and the hydraulic timing is stored and subsequently used for on-board diagnostic and/or fuel injection control.

10. A non-transitory computer readable medium encoded with a computer program product comprising instructions which, when the program is executed by a computer, cause the computer to carry out the method of claim 1.

11. A method of determining a hydraulic timing of a fuel injector in an internal combustion engine, wherein the injector is coupled to a fuel rail comprising a pressure sensor, the method comprising:

acquiring fuel pressure data, obtained by the pressure sensor, representing fuel pressure in the fuel rail over an acquisition window comprising an injection event of the injector;

determining a slope parameter corresponding to a pressure drop consequential to the injection event, the slope parameter being read from a slope map;

configuring a pressure drop model based on the slope parameter; and operating a fitting operation wherein the pressure drop model is fitted to the fuel pressure data, and wherein the hydraulic timing is derived from the pressure drop model;

wherein the pressure drop model describes a function having a first section at Pmax, a second section connecting the first section to a third section at Pmin, the second section corresponding to a straight line having a slope matching to the slope parameter.

12. The method according to claim 11, wherein the hydraulic timing corresponds to the timing bridging the first and second sections.

13. A fuel injection system for an internal combustion engine, comprising a fuel injector coupled to a fuel rail equipped with a pressure sensor, and a control unit configured to command an injection event of the fuel injector, wherein the control unit is further configured to perform a method as claimed in claim 11.

14. A method of operating a fuel injection system for an internal combustion engine, wherein a hydraulic timing of an injection event is determined based on the method according to claim 11, and the hydraulic timing is stored and subsequently used for on-board diagnostic and/or fuel injection control.

15. A non-transitory computer readable medium encoded with a computer program product comprising instructions which, when the program is executed by a computer, cause the computer to carry out the method of claim 11.

16. A method of determining a hydraulic timing of a fuel injector in an internal combustion engine, wherein the injector is coupled to a fuel rail comprising a pressure sensor, the method comprising:

acquiring fuel pressure data, obtained by the pressure sensor, representing fuel pressure in the fuel rail over an acquisition window comprising an injection event of the injector;

determining a slope parameter corresponding to a pressure drop consequential to the injection event, the slope parameter being read from a slope map;

configuring a pressure drop model based on the slope parameter; and operating a fitting operation wherein the pressure drop model is fitted to the fuel pressure data, and wherein the hydraulic timing is derived from the pressure drop model;

wherein operating the fitting operation comprises computing the pressure drop model for a plurality of timings corresponding to a sampling frequency over an analysis window, and determining a corresponding fitting index reflecting the degree of matching between the fuel pressure data and the pressure drop model, and selecting the timing at which the best index is obtained;

wherein the fitting index represents the area between the curve described by the pressure data and the pressure drop model, and wherein the timing corresponding to the fitting index representing the smallest area is selected as hydraulic timing.

17. A fuel injection system for an internal combustion engine, comprising a fuel injector coupled to a fuel rail equipped with a pressure sensor, and a control unit configured to command an injection event of the fuel injector, wherein the control unit is further configured to perform a method as claimed in claim 16.

18. A method of operating a fuel injection system for an internal combustion engine, wherein a hydraulic timing of an injection event is determined based on the method according to claim 16, and the hydraulic timing is stored and subsequently used for on-board diagnostic and/or fuel injection control.

19. A non-transitory computer readable medium encoded with a computer program product comprising instructions which, when the program is executed by a computer, cause the computer to carry out the method of claim 16.

* * * * *